Figure 1:
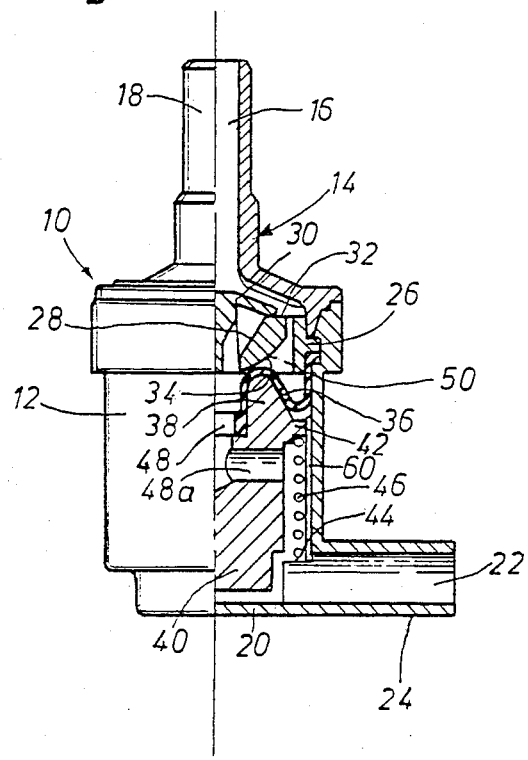

United States Patent [19]

Kleineberg et al.

[11] Patent Number: 4,697,612
[45] Date of Patent: Oct. 6, 1987

[54] VALVE ARRANGEMENT FOR THE VENTILATION AND THE VENTING OF FUEL TANKS FOR MOTOR VEHICLES

[75] Inventors: Wolfgang Kleineberg, Wendlingen; Dieter Scheurenbrand, Wolfschlugen, both of Fed. Rep. of Germany

[73] Assignee: Daimler-Benz Aktiengesellschaft, Fed. Rep. of Germany

[21] Appl. No.: 901,874

[22] Filed: Aug. 29, 1986

[30] Foreign Application Priority Data

Aug. 31, 1985 [DE] Fed. Rep. of Germany ....... 3531159

[51] Int. Cl.$^4$ ............................................. F16K 17/36
[52] U.S. Cl. .......................................... 137/39; 137/43
[58] Field of Search ................................... 137/39, 43

[56] References Cited

U.S. PATENT DOCUMENTS

| | | | |
|---|---|---|---|
| 3,280,838 | 10/1966 | Parkinson | 137/43 X |
| 3,568,695 | 3/1971 | DeFrees | 137/43 |
| 4,351,350 | 9/1982 | Crute | 137/43 X |
| 4,593,711 | 6/1986 | Morris | 137/43 X |

Primary Examiner—Robert G. Nilson

[57] ABSTRACT

A valve arrangement for ventilating and venting fuel tanks for motor vehicles which includes a vacuum valve, an excess pressure valve as well as a safety valve that interrupts the connection of the interior of the tank with the atmosphere beginning with a predetermined position of the valve arrangement deviating from the installed position. The safety valve includes a mass member displaceably arranged in the housing of the valve arrangement whose weight force is directed opposite the closing force of the excess pressure valve in the normal position of the valve arrangement and which beginning with a predetermined and subsequently continuing housing displacement acts increasingly on the valve closure member. It is assured thereby that the safety valve does not become operable already when the valve arrangement is not accurately installed or when the vehicle stands at an inclination but becomes effective only when it becomes actually necessary for safety reasons, for example, with a lateral roll-over of the vehicle caused by an accident, especially in the overturned position of a motor vehicle.

9 Claims, 2 Drawing Figures

U.S. Patent  Oct. 6, 1987  4,697,612

VALVE ARRANGEMENT FOR THE VENTILATION AND THE VENTING OF FUEL TANKS FOR MOTOR VEHICLES

The present invention relates to a valve arrangement for the ventilation and the venting of fuel tanks for motor vehicles.

The ventilation and venting line of fuel tanks is customarily equipped with a valve arrangement which assures that in case of a lateral roll-over of the vehicle caused by an accident, no fuel can flow out of the ventilating and vent line, especially in the overturned position of the respective vehicle.

A valve arrangement is thereby already known in the prior art with a housing provided with a connecting channel and a ventilating and venting channel in which are provided a vacuum valve opening with a vacuum in the tank, an excess pressure valve opening with an excess pressure in the tank as well as a safety valve disposed below the excess pressure valve in the installed position of the housing, whereby the safety valve includes a displaceable mass member, by means of which, beginning with a predetermined inclined position of the housing, a valve member is movable into its closing position under the influence of gravity. This prior art valve arrangement assures that beginning with a certain deviation of the fuel tank from its normal position, the ventilation and vent line thereof remains closed absolutely tightly.

This is achieved by means of a safety valve which includes a displaceable mass member that keeps a valve member in the closing position by the action of gravity with a corresponding housing displacement (manufacturer: W. Alfmeier KG, 8830 Treuchtlingen).

The safety valve is connected ahead of the excess pressure valve and includes a valve member in the manner of a cage in which is accommodated the mass member in the form of a steel ball which in the normal position of the fuel tank, respectively, with vertical installed position of the valve arrangement rests in a receiving means tapering downwardly funnel-shaped and fixed at the housing and is without contact with the cage, respectively, the valve member.

If a displacement of the ball-receiving means from its normal position takes place, then the ball rolls off along the incline thereof and thereby takes along the valve member into its closing position.

This prior art safety valve, however, reacts in a very sensitive manner to a positional change of the valve housing by reason of its freely movably arranged ball so that already with a not-exactly vertical assembly or with a corresponding inclined vehicle, the tank ventilation is interrupted. A non-permissively high pressure may thereby build up in the fuel tank.

It is therefore the object of the present invention to provide a valve arrangement of the type described above whose safety valve becomes operable only if an increased closure pressure is required exclusively for safety reasons, respectively, the connection of the ventilation and vent line with the atmosphere has to be interrupted.

The underlying problems are solved according to the present invention in that for purposes of closing the safety valve, the mass member thereof is arranged movable in the housing rectilinearly in the direction of its closing member and in the direction toward the connecting channel.

By reason of the rectilinearly movable arrangement of the mass member in the housing, it is achieved that the mass member is displaced in the closing direction of the valve closure member of the safety valve only when the housing of the valve arrangement continues to be displaced beyond a predetermined inclined position. As the mass member is thereby displaced only under the influence of gravity inside of the housing in the closing direction of the valve closure member and with correct installation of the housing is located underneath the valve closure member, the safety valve becomes active only when the housing of the valve arrangement is displaced out of its installed position over an angle larger than 90°. Only beginning with such a displacement a tight closure of the ventilation and vent line is in fact necessary, whereby the maximally attainable closure pressure of the safety valve is determined according to the selection of the size and of the material of the mass member and of the weight resulting therefrom for the same.

According to a preferred embodiment in accordance with the present invention, the excess pressure valve includes a valve closure member retained in the closing position by a compression spring which at the same time is that of the safety valve. This construction offers the advantage that only two valves have to be accommodated in the housing of the valve arrangement and can thus be constructed particularly space-savingly because in this case the valve closure member of the excess pressure valve forms at the same time that of the safety valve, respectively, these two valves can be combined with each other. A further advantage exists as the excess pressure and safety valve can be constructed as space-saving plate or disk valve because the natural frequency causing noises during the discharge is displaced to lower, non-critical values by the mass member. The mass member may thereby be provided as a part separate from the valve closure member. However, a construction according to the present invention is advantageous if the mass member forms a part of the valve closure member of the excess pressure valve and is supported at the compression spring.

The significant advantage results operationally from this combined embodiment of mass member and valve closure member that the valve closure force effective in the installed position of the valve arrangement successively increases from the beginning with a displacement of the valve arrangement from its installed position, in that the weight force of the mass member which, in the correct installed position, acts opposite the closing force of the compression spring, is initially reduced to zero (angle of rotation 90°) during the housing displacement and thereafter with an increasing angle of rotation acts in the direction of the valve closure member and therewith in a spring-reinforcing manner.

Figure 2:
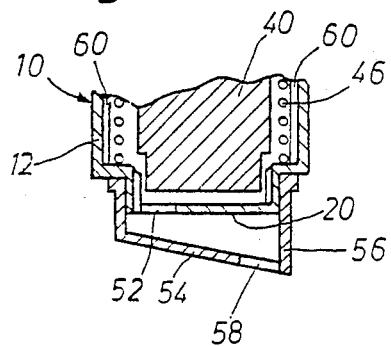

These and other objects, features and advantages of the present invention will become more apparent from the following description when taken on connection with the accompanying drawing which shows, for purposes of illustration only, two embodiments in accordance with the present invention, and wherein:

FIG. 1 is a partial longitudinal cross-sectional view through a valve arrangement in accordance with the present invention; and FIG. 2 is a partial longitudinal cross-sectional view through a modified embodiment of a valve arrangement in accordance with the present invention modified as regards the ventilation and venting channel.

Referring now to the drawing wherein like reference numerals are used throughout the two views to designate like parts, the valve arrangement illustrated in the drawing includes a housing generally designated by reference numeral 10 which is composed of a box-shaped lower housing part 12 and of an upper housing part 14. The upper housing part 14 forms a closure lid or cover, so to speak, at the central part of which a connecting nipple 18 containing a connecting channel 16 is formed-on whereby a ventilation and venting line of a fuel tank of a motor vehicle is adapted to be connected with the connecting nipple 18.

A further connecting nipple 24 is formed-on at the lower housing part 12 within the area of its bottom 20 which extends in a lateral direction and accommodates a ventilation and vent channel 22; an active charcoal filter for binding gaseous hydrocarbons is adapted to be connected in a known manner to the connecting nipple 24.

Valves are provided between the two channels 16 and 22 on the inside of the housing 10 whose valve, respectively, sealing-seats are provided at a common carrier which is formed by an intermediate housing part 26 provided in the upper area of the lower housing part 12. This intermediate housing part 26 includes a central passage 28, for example, tapering downwardly, to which a plate-shaped valve closure member 30 of the vacuum valve is coordinated which closes the same in the upward direction and rests on an upper valve seat surface 32 by gravity. The upper housing part 14 extends partly over the valve closure member 30 at a slight distance.

The central passage 28 of the intermediate housing part 26 is in communication, as will be described in detail hereinafter, with the ventilation and vent channel 22 so that in case a vacuum occurs in the fuel tank, the valve closure member 30 is lifted off from the valve seat surface 32 and air can be sucked-in by way of the ventilation and vent channel. The open position of the valve closure member 30 is determined by the upper housing part 14 partly overlapping the valve closure member, whereby the valve closure member 30 abuts at the upper housing part 14. The valve closure member 30 and the valve seating surface 32 as well as the passage 28 form therefore the vacuum valve.

The intermediate housing part 26 includes on its side opposite the valve seating surface 32 a further valve seating surface 34, to which a valve closure member 36, preferably in the form of a conventional roller diaphragm is coordinated whose ring-shaped diaphragm bead cooperates with the valve seating surface 34 and rests on an end-face annular collar 38 of a mass member 40 rectilinearly displaceably guided in the lower housing part 12.

A circumferential collar 42 is formed-on in the upper area of the mass member 40 by means of which the mass member 40 is supported on a compression spring 46 which accommodates the mass member to a predominant extent and which is seated with its lower end on an internal ring shoulder 44 of the lower housing part 12. The compression spring 46 seeks to keep the valve closure member 36 constantly in the closing position by way of the mass member 40.

The valve seating surface 34, the valve closure member 36 and the mass member 40 form both an excess pressure as also a safety valve combined with the same whose operation will be described more fully hereinafter.

As illustrated in FIG. 1, a connecting channel 48 terminates from the central portion of the end face of the mass member 40 provided with the ring collar 38, in the discharge opening of which the roller diaphragm 36 is clamped fast by means of its inner edge portion in any suitable manner whereas it is clamped fast with its outer edge portion between the intermediate housing part 26 and the lower housing part 12.

The partial section 48a of the connecting channel 48 which continues in the mass member 40 terminates at the circumference of a cylindrical partial section of the mass member 40 which is located inside of the compression spring 46 and is connected constantly with the ventilation and vent channel 22.

As shown in FIG. 2, the connecting channel 48 may also terminate in the housing bottom 20 at 52 insofar as the valve arrangement is to be used in an open construction, i.e, without series-connected active charcoal filter.

In order to avoid in this case that splash water can enter into the housing from below, a cover hood 56 preferably provided with an obliquely dropping-off bottom 54 is mounted over the lower end of the lower housing part 12, in the bottom 54 of which is provided an opening 58 at the lowest place thereof and at a radial distance to the bottom opening 52. This construction effects a labyrinth-like flow configuration whereby spray water entering into the cover hood 56 can again immediately drain out of the same and cannot reach the bottom opening 52.

An excess pressure occurring in the fuel tank is able to act by way of channels 50 extending through the intermediate housing part 26 in the axial direction on the valve closure member 36 and is able to displace the same into the open position against the action of the compression spring 46.

With a correct vertical installed position of the valve arrangement, the closure force acting thereby on the valve closure member 36 of the excess pressure and safety vale corresponds thereby to the abutment force of the compression spring less the counterweight of the mass member 40 counteracting the same.

If the valve arrangement is displaced from its vertical installed position at an inclination, for example, during an accident, then initially the weight force of the mass member 40 which is directed opposite the spring force, decreases continuously to the value zero up to an angle of rotation of 90° of the housing 10 which means that at the same time the closing force of the compression spring 46 increases continuously by this value.

With a continuously increasing angle of rotation from 90° to 180°, the weight force of the mass member 40, by contrast, also acts increasingly assisting the spring, respectively, in the direction of the abutment force produced by the compression spring 46 and acting on the valve closure member 36 of the excess pressure and safety valve so that finally a maximum closing force is effective which precludes a fuel discharge at least over a predetermined time interval.

In the valve arrangement according to the present invention, an additionally abutment force acting on the valve closure member 36, in addition to the closing force of the compression spring 46, is thus produced by the safety valve preferably combined with the excess pressure valve in case of a danger which, beginning with a predetermined and continuing housing shifting increases continuously up to a maximum value.

The intensity of the abutment force effecting the safety closure can be varied by a corresponding selection of the material and of the size of the mass member 40.

For reducing the friction of the mass member 40 inside of its rectilinear guidance in the lower housing part 12, the mass member 40 has advantageously merely a line contact with the lower housing part 12 for which purpose, guide webs 60 extending, for example, at the inner circumference of the lower housing part 12 along cylindrical surface lines are provided, with which the circumferential collar 42 of the mass member 40 is in sliding contact.

However, a ball, especially a steel ball, may also be provided as mass member which is supported in a cylindrical guide channel of the housing.

While we have shown and described only two embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A valve arrangement for ventilating and venting fuel tanks for motor vehicles, comprising housing means having a connecting channel for connecting to said tank and a ventilation and venting channel, vacuum valve means opening in case of a vacuum in the tank, excess pressure valve means opening in each of an excess pressure in the tank and safety valve means located underneath the excess pressure valve means in the installed housing position, all of said valve means being provided in said housing means, said safety valve means including a displaceable mass member by means of which a valve closure member is movable under the influence of gravity into its closing position beginning with a predetermined inclined position of the housing means, the weight force of the mass member acting on the valve closure member increasing in the course of a continuing housing displacement, and for purposes of closing the safety valve means, the mass member thereof being movably arranged in the housing means rectilinearly in the direction of the valve closure member and in the direction towards the connecting channel to close said safety valve against pressure in said tank.

2. A valve arrangement according to claim 1, wherein the excess pressure valve means includes a valve closure member retained in the closing position by a compression spring, the valve closure member being at the same time that of the safety valve means.

3. A valve arrangement according to claim 2, wherein the mass member forms a portion of the valve closure member of the excess pressure valve means and is supported at the compression spring.

4. A valve arrangement according to claim 3, wherein the valve closure member of the excess pressure and safety valve means includes a roller diaphragm means having an annularly shaped diaphragm bead abutting at a relatively fixed sealing seat, the roller diaphragm means being operable to be pressed against the sealing seat by the compression spring, the diaphragm bead resting on an annular collar of the mass member and being fixed with its inner edge portion at the inner circumference of the annular collar and with its outer edge portion at the housing means, and the mass member having on the side of the diaphragm means a central connecting channel connected with the venting and ventilation channel.

5. A valve arrangement according to claim 4, wherein the compression spring at least partly accommodates within it the mass member.

6. A valve arrangement according to claim 2, wherein the compression spring at least partly accommodates within it the mass member.

7. A valve arrangement according to claim 2, wherein the excess pressure valve means includes a valve closure member retained in the closing position by a compression spring, the valve closure member being at the same time that of the safety valve means,
   wherein said weight acts against said spring in an installed housing position and acts with the spring beginning with said predetermined inclined position.

8. A valve arrangement according to claim 1, wherein said connecting channel is above said safety valve in the installed housing position.

9. A valve arrangement for ventilating and venting fuel tanks for motor vehicles, comprising housing means having a connecting channel and a ventilation and venting channel, vacuum valve means opening in case of a vacuum in the tank, excess pressure valve means opening in each of an excess pressure in the tank and safety valve means located underneath the excess pressure valve means in the installed housing position, said valve means being provided in said housing means, said safety valve means including a displaceable mass member by means of which a valve closure member is movable under the influence of gravity into its closing position beginning with a predetermined inclined position of the housing means, the weight force of the mass member acting on the valve closure member increasing in the course of a continuing housing displacement, and for purposes of closing the safety valve means, the mass member thereof being movably arranged in the housing means rectilinearly in the direction of the valve closure member and in the direction towards the connecting channel,
   wherein the excess pressure valve means includes a valve closure member retained in the closing position by a compression spring, the valve closure member being at the same time that of the safety valve means, and
   wherein the valve closure member of the excess pressure and safety valve means includes a roller diaphragm means having an annularly shaped diaphragm bead abutting at a relatively fixed sealing seat, the roller diaphragm means being operable to be pressed against the sealing seat by the compression spring, the diaphragm bead resting on an annular collar of the mass member and being fixed with its inner edge portion at the inner circumference of the annular collar and with its outer edge portion at the housing means, and the mass member having on the side of the diaphragm means a central connecting channel connected with the venting and ventilation channel.

* * * * *